United States Patent Office 3,636,193
Patented Jan. 18, 1972

3,636,193
METHOD OF IMPROVING THE CONCEPTION RATE IN COWS
Jack F. Wagner and Edward L. Veenhuizen, Greenfield, Ind., assignors to Eli Lilly and Company, Indianapolis, Ind.
No Drawing. Continuation-in-part of application Ser. No. 750,489, Aug. 6, 1968, which is a continuation-in-part of application Ser. No. 541,086, Apr. 8, 1966, both now abandoned. This application Mar. 7, 1969, Ser. No. 805,344
Int. Cl. A61k 17/06
U.S. Cl. 424—100
5 Claims

ABSTRACT OF THE DISCLOSURE

The pregnancy rate in cows is improved by the administration of a gonadotropin within 72 hours after the onset of estrus, each cow being bred shortly after onset of estrus.

CROSS-REFERENCE

This application is a continuation-in-part application of our co-pending application Ser. No. 750,489, filed Aug. 6, 1968, which was in turn a continuation-in-part of our then co-pending application Ser. No. 541,086, filed Apr. 8, 1966, both now abandoned.

BACKGROUND OF THE INVENTION

Heretofore, sex hormones such as the progestational agents, including progesterone, chloramdinone (6-chloro-$\Delta^6$-17-acetoxy progesterone), and the like, or the estrogenic hormones, including estradiol, estratriol, estrone, and the like, have been employed to synchronize estrus in female mammals. With the increased use of artificial insemination, the synchronization of estrus in female domestic animals has received a great deal of attention since it is most desirable in actual practice to have all females in the group come into estrus during a one- or two-day period so that the technician in charge of the artificial insemination program need not be in attendance every day during an estrus cycle of the particular species. However, the conception rate in a synchronized estrus-artificial insemination program is lower than desirable.

In general, when it is desired to synchronize estrus in a group of cows or heifers, it has been common to administer a particular progestational agent to all members of the group for a set number of days, after which time the hormone treatment is stopped. Estrus then begins about three days after withdrawal of the drug. When estrus is seen to begin, the cycling females are bred, either by artificial insemination or by letting one or more bulls into the cow herd. After a first synchronized breeding period, it is common practice to take all of the cows who did not conceive at the first service and breed them again during the next estrus period, which will also be synchronized since a group of cows will usually remain synchronized for 2 to 3 breeding periods following an initial synchronization using a progestin. It is, of course, an object of any breeding program, including the type outlined above, to achieve pregnancy rates of 80 percent or better after two cycles. However, normally with cattle, pregnancy rates following two synchronized ovulation-breeding periods will be in the ranges 65 to 70 percent, below that achieved with range breeding.

It is an object of this invention to provide a method for increasing the pregnancy rate and the number of live births in cows over those ordinarily attainable in a progestin synchronized estrus-artificial insemination program as well as in increasing pregnancy rates in unsynchronized cattle, or in synchronized cattle who come into estrus naturally rather than upon the withdrawal of a progestin.

DESCRIPTION OF THE INVENTION

In fulfillment of the above and other objects, this invention provides a method of increasing the pregnancy rate in cows by administering a gonadotropin to said cows within 0–3 days following the onset of estrus. Broadly speaking, our invention comprises the administration of a gonadotropin to a cow during the first three days of an estrus cycle, said cow being bred during the early portions of the same cycle.

While it has been a common practice to use gonadotropins to induce follicular growth and ovluation, gonadotropins have not heretofore been used to increase conception rates after estrus. The term gonadotropin as used herein includes among other preparations, pregnant mares serum (PMS), lutenizing hormone (LH), follicle stimulating hormone (FCH), and human chorionic gonadotropin (HCG).

Our invention is particularly adapted for use in an estrus synchronization programs with cows. This term includes, of course, young cows or heifers. In such a program, a group of cycling cows is synchronized by treatment for 14 to 18 days with a progestational agent such as chlormadinone acetate. The drug is then withdrawn, the cows coming into estrus during the next five days. Twelve hours after signs of estrus show, each cow is artificially or naturally inseminated. A gonadotropin, such as PMS or HCG, is administered, either just prior to or after insemination, in any case, not later than 24 hours after onset of estrus. For best results, the cow should be artifically inseminated approximately 12 hoors after the onset of estrus, ovulation following about 18 hours later, but the gonadotropin should be administered within the first 24 hours after onset of estrus. The pregnancy rate of those cows receiving the above post-estrus gonadotropin treatment is increased 10 to 16 percent as compared with cows not receiving said treatment.

With cows coming into estrus naturally, i.e. when estrus is not induced by withdrawal of a progestational agent, the gonadotropin can be administered up to 3 days after the onset of estrus with similar favorable increase in pregnancy rate. As in the case of cows whose estrus is synchronized by the administration and withdrawl of a progestational agent, these cows should also be bred within 24 hours, and preferably within 12 hours, after the first signs of estrus.

The following experiments will more fully explain the nature of our invention.

TRIAL 1

Two hundred Hereford heifers each received 10 mg. of chlormadinone acetate ( a progestational agent employed to synchronize estrus) for 14 days followed by 5 mg. of chlormadinone acetate for 4 days. Following the termination of the treatment, estrus checks were made twice daily. As the heifers came into estrus, they were all artificially inseminated 12 hours after onset of estrus. The inseminated heifers were then divided into 4 treatment groups: Group 1, those receiving injection medium alone (control), Group 2, those receiving 1000 IU of PMS, Group 3, those receiving 1000 IU of HCG and Group 4, those receiving 1000 IU of both PMS and HCG. The injection medium consisted of 5 percent beeswax in sesame oil. The HCG and the PMS were suspended in the injection medium. The injection, of the material thus prepared was made subcutaneously in the shoulder area of the heifer at the time of insemination. The animals were observed for signs of estrus and those failing to conceive were bred at a second synchronized breeding period in an identical manner with each animal being randomly reassigned to the previous treatment group and again given the same gonadotropin. Table I which follows gives the results of these experiments. In the table, column 1 gives the treatment, column 2 the number of animals, column 3 the conception rate and column 4 the percent difference of conception rate from the control group. Table II gives the same information for the second synchronized breeding period. (Although the second breeding period is referred to as a synchronized breeding period, it should be understood that this synchronization occurs because of the synchronization of the first breeding period. Once synchronized, the cow herd will remain synchronized for several estrus cycles without further progestin administration. This second estrus is not induced by withdrawal of a prior administered progestational agent, but is a "natural" estrus.)

TABLE I

| Treatment | Number of animals | Conception Number | Conception Percent | Percent of control |
|---|---|---|---|---|
| 1,000 IU PMS | 46 | 12 | 26 | +37 |
| 1,000 IU HCG | 46 | 13 | 28 | +47 |
| 2,000 IU PMS plus HCG | 46 | 15 | 33 | +74 |
| None (control) | 47 | 9 | 19 | |

TABLE II

| Treatment | Number of animals | Conception Number | Conception Percent | Percent of control |
|---|---|---|---|---|
| 1,000 IU PMS | 36 | 20 | 56 | +19 |
| 1,000 IU HCG | 34 | 20 | 59 | +26 |
| 2,000 IU PMS plus HCG | 35 | 22 | 63 | +34 |
| None (control) | 36 | 17 | 47 | |

As can be seen from the above tests, administration of a gonadotropin increased the pregnancy rate.

TRIAL 2

Two groups of 94 heifers each were synchronized according to the following procedure: Group A received 10 mg. of chlormadinone acetate per heifer per day for 14 days followed by 5 mg. for 4 days. Group B received 10 mg. of chlormadinone acetate per heifer per day for 16 days followed by 5 mg. for 2 days. The treatment was discontinued and signs of estrus noted as before. Each animal was bred about 12 hours after the onset of estrus. About one half of each synchronized group was given 2000 IU of HCG at the time of breeding and the other half was given no gonadotropin treatment. Table III, which follows, gives the results of this trial. In the table, column 1 gives the synchronized group as defined hereinabove, column 2 the treatment, column 3 the number of heifers in the treatment group, column 4 the precent of heifers conceiving and column 5 the percent difference taken as a percent of the treatment group.

TABLE III

| Syncronized group | Gonadotropin treatment | Number of animals | Conception Number | Conception Percent | Percent of control |
|---|---|---|---|---|---|
| A | 0 | 43 | 15 | 35 | |
| A | 2,000 IU HCG | 45 | 22 | 49 | +40 |
| B | 0 | 43 | 15 | 35 | |
| B | 2,000 IU HCG | 42 | 21 | 50 | +42 |

Table IV gives the breeding experience for those animals at a second trial at which time they did or did not receive an additional 2000 IU of HCG.

TABLE IV

| Gonadotropin treatment | Number of animals | Conception Number | Conception Percent | Percent of control |
|---|---|---|---|---|
| Control | 48 | 24 | 50 | |
| 2,000 IU HCG | 48 | 31 | 65 | +30 |

It can be seen from the above trial that the increased conception rate attributable to treatment with a gonadotropin is more marked at the first synchronized breeding period.

Analysis of the above data indicated that the increased pregnancy rate upon treatment with HCG is statistically significant at the 99.3 percent confidence level for the first breeding period, and the difference is statistically significant at the 99.7 percent confidence level for the combined breeding periods. In all of the above trials taken as a whole, there were approximately 15 more conceptions per 100 cows in animals treated with 1000 IU to 2000 IU of HCG or its equivalent per day compared with a control group receiving no hormone.

TRIAL 3

In a second synchronized breeding period similar to the ones the results of which were given in Tables II and IV above, 200 IU of HCG or PMS were administered to groups of cows 3 days after the onset of estrus. Each cow was inseminated 12 hours after the onset of estrus. This estrus was a "natural" estrus as explained above. Table V, which follows, gives the results of this trial. In Table V, column 1 gives the gonadotropin treatment, column 2 the number of animals in the group, column 3 the number of conceptions, column 4 the percentage of conceptions, and column 5 the increase in percent over the control group.

TABLE V

| Treatment | Number of animals | Conception Number | Conception Percent | Increase in percent over control |
|---|---|---|---|---|
| 2,000 IU HCG | 33 | 21 | 64 | +10 |
| 2,000 IU PMS | 32 | 23 | 72 | +18 |
| None (control) | 33 | 18 | 54 | |
| 1,000 IU HCG | 36 | 19 | 53 | +3 |
| 1,000 IU PMS | 36 | 22 | 61 | +11 |
| 1,000 IU of each | 33 | 20 | 61 | +11 |
| None (control) | 36 | 18 | 50 | |

We claim:

1. A method of increasing the pregnancy rate and percent of live births in cows which comprises administering from 1,000 to 2,000 IU of human chorionic gonadotropin or of pregnant mares serum separately or 1,000 IU each of human chorionic gonadotropin and pregnant mares serum by injection to a cow after said cow comes into estrus and just prior to or after said cow is inseminated.

2. The process of claim 1 in which human chorionic gonadotropin and/or pregnant mares serum is administered 0–3 days after onset of estrus.

3. The process of claim 1 in which pregnant mares serum is administered.

4. The process of claim 1 in which human chorionic gonadotropin is administered.

5. In an estrus synchronization program for breeding cows, the improvement which comprises administering from 1,000 to 2,000 IU of human chorionic gonadotropin or of pregnant mares serum separately or 1,000 IU each of human chorionic gonadotropin and pregnant mares serum by injection to each of said synchronized cows within 24 hours following the onset of estrus and just prior to or after insemination.

References Cited

Pincus et al.—The Hormones—vol. III—1955—Academic Press, New York, N.Y., pages 337–342.

SAM ROSEN, Primary Examiner

U.S. Cl. X.R.

424—101, 105